March 20, 1956 N. HUBBARD 2,738,721
COFFEE MAKER
Filed June 23, 1950
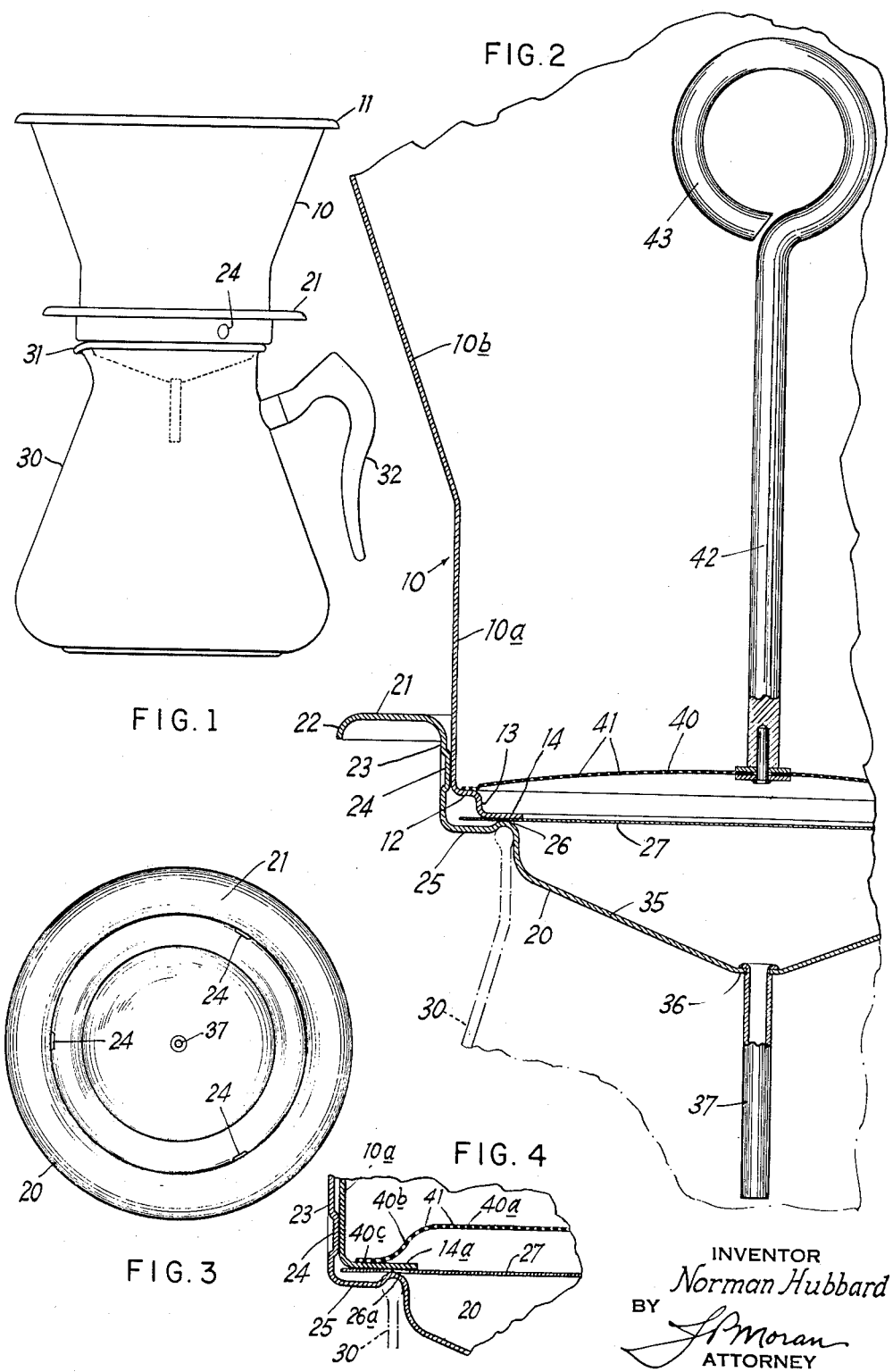
INVENTOR
Norman Hubbard
BY
J. P. Moran
ATTORNEY

United States Patent Office 2,738,721
Patented Mar. 20, 1956

2,738,721

COFFEE MAKER

Norman Hubbard, Akron, Ohio, assignor to Isaac Harter, Beaver, Pa.

Application June 23, 1950, Serial No. 169,813

6 Claims. (Cl. 99—306)

The present invention relates in general to the construction of filtering devices, and more particularly, to the construction of beverage makers of the filtering type in which an extract beverage is prepared by passing a liquid solvent, such as boiling or hot water, over or through a mass of starting material having soluble flavor-imparting constituents, such as ground or powdered coffee or tea leaves, in a filtering container or in a separate vessel before introduction into the filtering container.

Beverage makers of this type usually embody an inverted frusto-conical member supporting a circular sheet of chemical filter paper folded diametrically and then into the form of a conical filter into which the starting material and liquid solvent are separately or simultaneously placed and which is intended to eliminate all deleterious solid material in suspension, leaving a clear filtrate. This is essential in coffee makers if good coffee is to be made. Coffee should preferably be made with the water at a temperature just below the boiling point, e. g. at a temperature of 190°–200° F. Air tends to enter the water at temperatures below the boiling point, and if solid matter is present in the filtrate, it will be oxidized into bad smelling and tasting compounds as the coffee cools down. Virtual elimination of solid matter is therefore essential. Such filtering devices are characterized by a relatively large area of filter paper in contact with the starting material and liquid solvent in comparison with the effective filtering area thereof. Since the area of the filter cone is equal to only one-half the original paper area and the cone is usually filled with the filtrate liquid to not more than two-thirds of its height, only about one-third of the filter paper area is in direct contact with the liquid. The doubled side of the cone delays filtering. Relatively expensive quantities of thick filter paper or thinner paper having a high wet strength is normally required to permit subsequent handling of the same for disposal purposes. The resulting filtrate usually has a slight but noticeable "paper" taste, because of the low ratio of filtrate to the amount of filter paper used, which taste is objectionable to discriminating users. The filter cone thus includes much more paper than that required to make the geometry of the cone, and the rate of filtration therethrough is necessarily reduced by the blanketing effect of the supporting cone member. The filtration rate could be increased by making the filter paper thin and as porous as clear filtration will permit. Paper thinness and porosity however are limited by the necessity of minimizing the possibility of breakage or puncturing of the filter cone in use.

Attempts have been made to lessen this problem by using a horizontal disc of filter paper supported on a perforated bottom of the filter cup or on a supporting grill. No special provisions are made to prevent unfiltered liquid from escaping around the periphery of the filter. The arrangement of the contacting supporting member normal to the filter surface produces surfaces at right angles to one another having a cohesive effect on the liquid filtering through and thus a serious surface tension delaying action causing large adherent drops to form and remain in position and reducing materially the effective filter area and delaying filtration. The filtration rate resulting is so low that either an excessive filter area is needed to be practical or so porous a paper is used that a clear filtrate is unobtainable. For such reasons filtering devices of this type have not come into general use.

In coffee making, it has been found that the contact time between the hot water and coffee particles substantially affects the quality of the filtrate. If this time is too short, the filtered coffee is weak. If too long a contact time is used, the hot water extracts not only the good components of the coffee, but also those having an unpleasant taste and odor. The optimum period of extraction is considered by coffee experts to be between seven and nine minutes. With a given filter, the rate of filtration has been found to vary with the grind sizing used and the moisture content of the ground coffee when used.

The filtration rate, i. e. the number of filtrate volume units per filtered time unit per unit area of the filter paper, can be increased several times over the described filter cone devices, as disclosed in the prior copending application of Isaac Harter, Serial No. 27,761, filed May 18, 1948, now abandoned, by the use of a circular sheet of chemical filter paper held in its horizontal filtering position by peripherally gripping means only, whereby substantially the entire area of the filter paper is devoid of any bottom support and thus uniformly effective for filtering purposes under a uniform hydraulic head of the filtrand thereabove, in combination with a filtrate chamber below the unimpeded underside of the filter paper in which a partial vacuum is created and maintained by the air pumping action of a stream of filtrate discharging through a discharge tube of limited cross-sectional area.

With a horizontally arranged disc of filter paper positioned between a reservoir or cup member and a subjacent funnel member, as described, the hydraulic head on the exposed filter area causes the water to leach out the finer particles from the mass of coffee which results in a relatively thick adherent coating of fine coffee particles being deposited on the upper surface of the filter paper. This adherent coating clogs the minute pores in the filter paper and thus impedes the filtering action to a substantial extent.

With this filter arrangement, it has also been found that the filter peripheral edge portions tend to act like a wick to pass liquid into the space circumferentially surrounding the filter when the hot water is initially introduced. This liquid is subsequently sucked back through the filter and into the filtrate chamber towards the end of the filtration period by the vacuum effect. This wick action thus tends to reduce the vacuum effect and thus lengthen the filtration period.

In accordance with the present invention, a further increase in the filtration rate, on the order of several times the filtration rate without the present invention, is effected in a filtering device of the general character disclosed in said copending Harter application. This further increase in filtration rate is primarily due to the inclusion of a screen element having openings therein of a size and total area sufficient to permit a relatively free flow of liquid therethrough and spaced above the upper surface of the filter paper sufficiently to eliminate any liquid cohesive effect between the underside of the screen and upper surface of the filter paper which would tend to reduce the filtration rate. A further effect of such a screen element is to eliminate the differences in filtering time previously found with starting materials of different fineness, such as coffee of different grinds, or of different moisture content when used. A further feature of the invention is an improved construction of the filter paper holding parts which provides a positive tight connection between these parts, insuring elimination of any wick effect of the filter paper and thus not only avoids liquid leakage around the filter periphery but also improves the vacuum effect below the filter paper. In accordance with the invention, the foregoing improvements in operation are obtained in a filtering device formed of a few permanent parts made of a metal, such as stainless steel, which does not affect the taste of the filtrate. These parts are constructed to facilitate disposal of the filtrand by the user, and to permit all of the liquid solvent to be supplied in one operation. The foregoing characteristics when coupled with a low cost of manufacture and a low cost renewable filter member provide a highly desirable commercial product.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which is illustrated and described preferred embodiments of the invention.

Of the drawings:

Fig. 1 is an elevation of a beverage maker constructed in accordance with the invention;

Fig. 2 is an enlarged fragmentary sectional elevation of the beverage maker shown in Fig. 1;

Fig. 3 is a plan view of the funnel member; and

Fig. 4 is a view similar to Fig. 2 of a modified construction.

The beverage maker illustrated comprises an upper reservoir or cup member 10 of circular cross-section throughout its height and open at both its upper and lower ends. The cup has a lower section 10ª of reduced cylindrical cross-section and an upwardly flaring frusto-conical upper section 10ᵇ flaring at an angle of approximately 20° to the vertical. The lower section is of sufficient volume so that when used as a coffee maker, for example, it can contain all of the wet coffee grounds in a coherent cake. The upper section 10ᵇ has a curved top flange 11 and is made of sufficient volume so that all of the liquid solvent can be added at one time. With the cup member of this volumetric capacity and so filled, most of the filtering will take place under a high hydraulic head. The lower section 10ª has an inwardly bent lower portion forming an annular horizontal shelf 12, a short depending cylindrical portion 13, and an inwardly extending narrow annular horizontal flange 14.

The cup member cooperates with a metallic funnel member 20 of circular horizontal cross-section which has a top horizontal flange 21 terminating in a quarter round outer bead 22, a depending cylindrical inner portion 23 having a pluraliy of uniformly circumferentially spaced inwardly projecting circular lands or bumps 24 disposed in the same horizontal plane intermediate the height of the section 23, and a horizontally extending annular flange 25 extending inwardly from the section 23 and terminating in an ogee portion to form a raised seat ring 26 on which the peripheral portion of a filter member 27, preferably a circular sheet of chemical filter paper .005–.007″ in thickness, is adapted to be supported. The filter paper need not be of particularly high wet strength for use in the present device.

The funnel member flange 25 is adapted to rest on the upper end of a subjacent filtrate receiver 30, such as a flask or pitcher of any suitable form. The receiver has a pouring lip 31 which also functions as an exit for air displaced from the receiver by the filtrate. A thermally insulated handle 32 of any suitable type it attached to the receiver.

The funnel member 20 extends vertically downwards from the seat ring 26 and thence into a downwardly converging frusto-conical section 35 at an angle of approximately 22½° to the horizontal and terminating in a central flat 36 which is perforated to receive a discharge tube 37 of small inside diameter and of a length many times its diameter. As disclosed in said copending Harter application, the discharge tube 37 is so sized that the filtrate discharged therethrough will create and maintain an optimum partial vacuum in the filtrate chamber defined by the filter and funnel members. For example, with this chamber shaped as described and 3⅜″ I. D., the discharge tube was made approximately 1¼″ long and ⅛″ I. D. for an effective air pumping action by the discharging stream of filtrate. The partial vacuum maintained during filtration was of the order of 7% of a full vacuum. The filtrate collects in the receiver 30 below the lower end of the discharge tube 37.

The lower cylindrical section 10ª of the cup member 10 is proportioned to permit its insertion into the cylindrical section 23 of the funnel member with its flanged lower end resting against the inside of the bumps 24, which as indicated in the drawings are preferably three in number. With a filter disc in position on the seat ring, the cup member is pressed down manually past the bumps 24 to grip the filter disc tightly between the horizontal flange 14 and seat ring 26 of the funnel member. The pressure on the three bumps 24 causes the cylindrical section 23 of the funnel to be slightly distorted into a substantially triangular formation, and the friction thereby created between the distorted funnel and cup member will be sufficient to hold the peripheral portion of a disc of filter paper of the character described compressed for an indefinite period without causing too great a friction effect for ready separation by the user. This compression of the filter disc compresses the felted paper fibers to such an extent that any wick effect of the peripheral portions of the filter disc will be eliminated, thus avoiding any flow of liquid into or from the space between the cup section 13 and funnel member flange 23 which would impair the vacuum.

As disclosed in said copending Harter application, the combination of a horizontally arranged peripherally supported filter disc with a filtrate chamber below its exposed underside under a partial vacuum, will produce a relatively high rate of filtration. Tests of such a coffee maker have shown at a rate of filtration per unit of filter paper of a given thickness 10–15 times as fast as the conventional filter cone method when comparing the total paper areas and about 8–12 times as fast when comparing the respective working areas of the filter elements. Experiments have also shown that differences in initial moisture content of the ground coffee make a wide difference in the filtration rate.

In accordance with the present invention, the filtration rate may be further substantially increased and the time of filtration at the increased rate stabilized for widely different grinds by adding to the described combination of filtering elements, a perforated plate or screen member 40 positioned substantially parallel to the filter member and separated from the upper side thereof by a distance, e. g. .2″, sufficient to avoid any cohesive effect on the liquid while between the under surface of the screen and upper surface of the filter member. In one embodiment, for example, the screen member 40 was made of an inverted shallow dished metal plate having a multiplicity of circular perforations 41 in the range of .04–.06″ in diameter and totaling approximately 35% of the screen member area. The peripheral edge portion of the screen member is flattened, and in use rests on the shelf 12 of the cup member, with the screen periphery adjacent the outer periphery of the shelf, as shown in Fig. 2. The screen member 40 has a shaft 42 secured to the center thereof and bent to form a lifting ring 43 at its upper end. The screen perforations are thus substantially larger than the pores in the filter paper and of sufficient size and total area to permit a relatively free flow of liquid through the screen.

In the use of the described filtering device as a coffee maker, the screen 40 is positioned on the shelf 12, as shown in Fig. 2, and a measured amount of ground coffee, either "regular," "drip" or "pulverized" grind, is poured into the cylindrical section 10ª of the cup member, so that it is supported by the screen 40. The water, at a temperature slightly below the boiling point, is then poured over the mass of coffee until the cup member is substantially full. A slight stirring of the mass is desirable to insure that all of the coffee is wetted. The perforated screen functions to prevent most of the fine particles of coffee from being carried down through the perforations and depositing on the upper surface of the filter paper and clogging pores thereof. The action is believed to be that the larger coffee particles form a pile over each perforation, so that the finer particles carried down with the liquid are largely caught in the crevices of such piles, while the liquid continues to flow downwardly through the screen perforations to the filter paper. The relatively small amount of fines deposited on the filter paper are not subjected to the weight of the superjacent mass of coffee and appear to have little, if any, effect on the filtration rate.

Many tests of the described device with and without the screen member 40 in service have definitely established that, with other conditions maintained the same, the rate of filtration when the screen is used in the described combination of filtering elements is between two and three times the filtration rate when the screen is not used. The tests also showed that with the screen in use the rate of filtration is substantially the same for coffee of "regular," "drip" or "pulverized" grinds and regardless of whether or not the ground coffee is dry or moist when used.

Substantially all of the filtrate discharges from the discharge tube 37 in a substantially continuous solid stream during the filtration period. Any filtrate remaining in the tube 37 and bottom of the funnel 20 due to the pressure differential can be readily discharged by puncturing the filter paper sufficiently to break the vacuum in the filtrate chamber.

With the high rate of filtration present in the described filtering device, the parts can be easily proportioned for any desired size beverage maker to have the flavor extraction period within the optimum time period. Coffee makers so constructed have been found to produce a high quality beverage free from "paper" and other deleterious tastes. This high quality is found to be still retained if the coffee should be reheated after cooling to approximately room temperature, indicating the virtual absence of oxidizable solids in the beverage.

The shape of the cup member permits the screen 40 to be raised vertically when the filtration has been completed, to carry the coffee grounds in a coherent cake for disposal in a waste receptacle. The cup member and funnel are then removed from the receiver 30 as a unit and separated by pulling in opposite directions on the flanges 11 and 21. The used disc of filter paper is then disposed of and the metal parts rinsed in hot water. All of the parts except the filter member are preferably made of polished stainless steel. The breakage problems of glass and ceramic beverage makers are thus avoided and cleaning simplified.

In the modified construction illustrated in Fig. 4, the form of the cup member and screen member is simplified to reduce their cost of manufacture and the funnel member seat ring modified to provide a more effective compression of the filter paper. The lower section 10ª has the portions 12 and 13 omitted and is formed with a single inwardly extending annular horizontal flange 14ª, which, under the holding action of the bumps 24, coacts with the funnel member seat ring 26ª to compress the disc of filter paper 27 tightly therebetween. The upper surface of the seat ring 26ª has a smooth finish and is advantageously tapered upwardly at an angle of approximately 20° to the horizontal to form a sharp annular horizontal ridge, which engages the underside of the filter paper to compress the fibers thereof. The screen member is formed by a horizontal disc shaped metal plate 40ª having a downwardly flaring depending outer portion 40ᵇ terminating in a flattened peripheral portion 40ᶜ which rests on the flange 14ª. The screen member has perforations 41 substantially throughout its area as in the manner previously described. The flaring portion 40ᵇ is proportioned in height to position the plate 40ª at the desired level above the plane of the filter paper 27. The filtration action with this construction is similar to that previously described.

While in accordance with the provisions of the statutes I have illustrated and described herein the best embodiments of my invention known to me, those skilled in the art will understand that changes may be made in the form of the filtering devices disclosed without departing from the spirit of the invention covered by my claims, and that certain features of my invention may sometimes be used to advantage without a corresponding use of other features.

I claim:

1. A coffee maker comprising a bottomless cup member adapted to receive a body of coffee grounds and water, a funnel member having a sharply curved convex annular peripheral portion forming a supporting seat for the lower end of said cup member, a horizontally arranged sheet of compressible filter paper having its periphery positioned between and contacting with the seating surfaces of said cup and funnel members, said sheet of filter paper cooperating with the subjacent portions of said funnel member to define an unobstructed filtrate chamber therebetween to which the entire underside of said sheet within said funnel member is directly exposed, holding means operable to cause the seating surfaces of said cup and funnel members to maintain a compressive stress directly on and throughout a narrow peripheral portion of said sheet, a filtrate receiver arranged to support said funnel member and having a lip opening therein normally open to the atmosphere during operation, and an elongated filtrate discharge tube depending from the central bottom portion of said funnel member and forming the sole filtrate flow connection between said filtrate chamber and filtrate receiver, said filtrate discharge tube having its lower end opening to said filtrate receiver above the normal maximum filtrate level therein and a restricted cross-sectional flow area proportioned to restrict the discharge of filtrate from said filtrate chamber and establish a column of filtrate in said tube and thereby create a partial vacuum in said filtrate chamber by the air-removing action of the filtrate draining through said discharge tube.

2. A coffee maker comprising a vessel having an open upper end for receiving the filtrate from a brewing operation, a funnel member including a frusto-conical section having its small end at the lower side thereof, an elongated filtrate discharge tube depending from the central portion of said frusto-conical section, the funnel member having an annular flange extending outwardly beyond the upper end of the frusto-conical section and resting upon the upper edge of the filtrate-receiving vessel and an upwardly-extending annular wall at the outer edge of said outwardly-extending annular wall at the outer edge of said outwardly-extending flange, the contour of the areas of the upper contacting edge of the filtrate-receiving vessel and the outwardly-extending flange of the funnel member being such as to provide a space for the escape of air from the filtrate-receiving vessel, an upper reservoir having an open lower end for receiving the coffee to be brewed, the lower portion of said reservoir being within the space surrounded by said upright annular wall and supported by the outwardly-extending flange of the funnel member, a horizontally-disposed compressible filter sheet overlying the open upper end of the frusto-conical section and having its peripheral portions extending between the lower edge of the upper reservoir and said outwardly-extending flange, said filter sheet and the subjacent portions of the funnel member defining an unobstructed filtrate-receiving chamber therebetween, means to facilitate maintaining the lower end of the upper reservoir in compressible engagement with the peripheral portion of the filter sheet, the cross-sectional area of the filtrate discharge tube being such as to restrict the discharge of filtrate from the filtrate-receiving chamber and to establish a column of filtrate therein and thereby create a partial vacuum in said chamber by the air-removing action of the filtrate draining through the discharge tube.

3. A coffee maker as defined in claim 2 in which said outwardly-extending flange of the funnel member has a narrow annular seat ring on which the peripheral portion of the filter sheet rests and against which it is compressed by the lower portion of the upper reservoir.

4. A coffee maker as defined in claim 3 which includes a flange extending outwardly from the upper edge of said upwardly-extending wall of the funnel member.

5. A coffee maker as defined in claim 3 which includes a screen member extending across the lower portion of the upper reservoir adjacent but spaced from the sheet of filter paper, said screen having openings substantially larger than the pores of the filter sheet, said screen being arranged to support the coffee to be brewed.

6. A coffee maker as defined in claim 5 in which the lower end of the upper reservoir has an inwardly-extending portion which bears upon the peripheral edge portion of the filter sheet and upon which the peripheral edge portion of said screen bears.

References Cited in the file of this patent

UNITED STATES PATENTS

| | | |
|---|---|---|
| 636,489 | Clarke | Nov. 7, 1899 |
| 761,702 | Paradis | June 7, 1904 |
| 762,794 | Ziegler | June 14, 1904 |
| 1,108,288 | Watson | Aug. 25, 1914 |
| 1,549,840 | Lemoine | Aug. 18, 1925 |
| 1,681,656 | Biette | Aug. 21, 1928 |
| 1,967,983 | Wolcott | July 24, 1934 |
| 1,991,653 | Broden | Feb. 19, 1935 |
| 2,133,178 | Sieling | Oct. 11, 1938 |
| 2,309,526 | Moore et al. | Jan. 26, 1943 |
| 2,382,594 | Wolcott | Aug. 14, 1945 |

FOREIGN PATENTS

| | | |
|---|---|---|
| 17,917 | Great Britain | 1907 |
| 374,729 | Great Britain | June 16, 1932 |
| 638,221 | Germany | Nov. 11, 1936 |

OTHER REFERENCES

Principles of Quantitative Analysis, by Walter C. Blasdale, published by D. Van Nostrand Co., New York, copyright 1914. Pages 120 and 121.